United States Patent [19]

Yasui et al.

[11] Patent Number: 4,655,617

[45] Date of Patent: Apr. 7, 1987

[54] SEALED ROLLING BEARING WITH A FLOW REDUCING GREASE PASSAGE

[75] Inventors: Hiroyoshi Yasui; Teruo Yoshida, both of Osaka, Japan

[73] Assignee: Koyo Seiko Co., Ltd., Osaka, Japan

[21] Appl. No.: 786,490

[22] Filed: Oct. 11, 1985

[51] Int. Cl.⁴ ............................................. F16C 33/66
[52] U.S. Cl. .................................. 384/465; 384/470; 384/488
[58] Field of Search ............... 384/488, 470, 465, 523, 384/572

[56] References Cited

U.S. PATENT DOCUMENTS 1,943,955  1/1934  Ege .
2,000,276  5/1935  Delaval-Crow .................... 384/488
2,034,567  3/1936  Fernström .......................... 384/488
4,236,767  12/1980  Feldle ................................. 384/488
4,353,605  10/1982  Chiba et al. ....................... 384/470

Primary Examiner—Lenard A. Footland
Attorney, Agent, or Firm—Finnegan, Henderson, Farabow, Garrett and Dunner

[57] ABSTRACT

A sealed type rolling bearing includes an another race, an inner race, a plurality of rolling elements, at least one retainer therefor, and at least one seal plate. The bearing is sealed with grease seal, and grease in the bearing is prevented from flowing at a high rate by means of an annular projection extending radially inwardly from the retainer defining a small gap defined between the projection of the retainer and the inner race.

11 Claims, 9 Drawing Figures

FIG. 5 FIG. 6
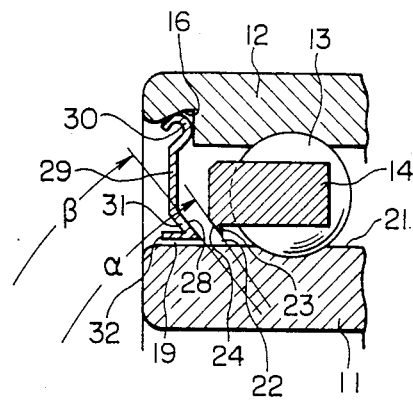
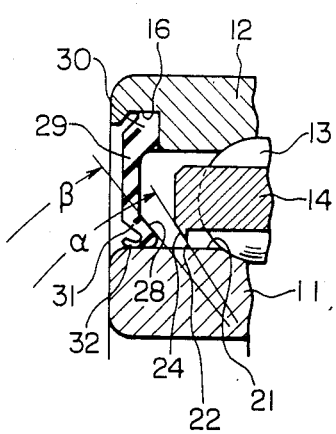
FIG. 7(a) FIG. 7(b)
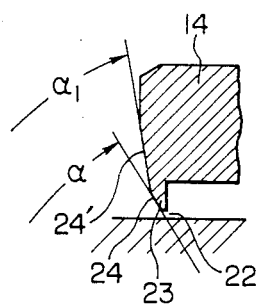
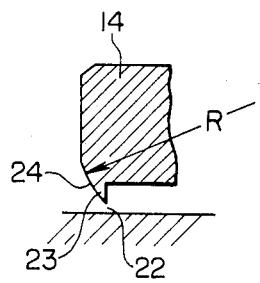
FIG. 8
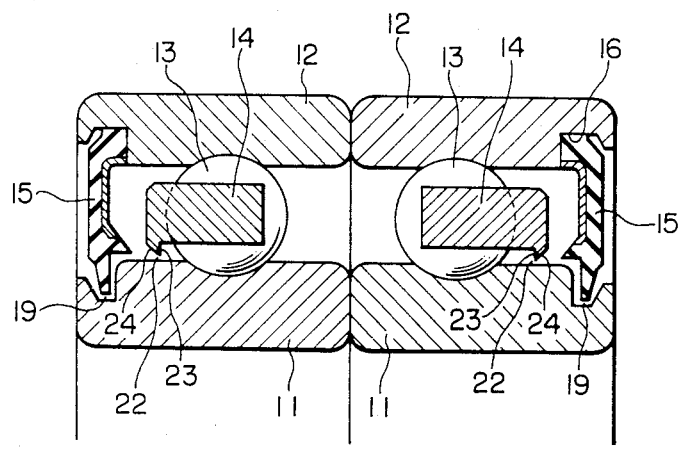

SEALED ROLLING BEARING WITH A FLOW REDUCING GREASE PASSAGE

BACKGROUND OF THE INVENTION

This invention relates to a rolling bearing having rolling elements equidistantly spaced about the bearing circumference. The rolling elements are held in place relative to each other by a retainer. The rolling elements and their retainer are positioned about inner and outer races. Grease seals in the form of seal plates or webs are secured at the ends of the bearing to the outer race to retain the grease used to reduce the friction between the rolling elements, retainer and races as the bearing rotates. The rolling bearing will be referred to herein as a roller bearing for convenience sake.

Grease seals are commonly employed in roller bearings used in various mechanisms and tools. Grease leaks and short lubricant life are problems often encountered with such rolling bearings, particularly when they are subjected to a high temperature and high speed operation. For instance, the bearing assembly for an electromagnetic clutch used in a car cooler compressor is known to be susceptible to grease leaks, with the grease escaping past the grease seal. It has been proposed, in an effort to prevent grease leaks, to provide a bearing assembly which incorporates therein a contact seal with the end of the outer race located closest to the electromagnetic clutch and a non-contact seal with the end of the outer race located closest to the compressor. Such an arrangement is described in Japanese Patent Publication No. 26269/78.

A generally known and available electromagnetic clutch of this type is illustrated in FIGS. 1 and 2. It is fabricated so that rolling bearing 3 is arranged on a boss 2 formed in a clutch body 1. A rotor includes a disc 5 disposed to face but be in non-contact with the front of an electromagnet 4 secured to the body 1. A cylindrical portion 6 axially extends from the inner periphery of the disc 5 over the generally cylindrical outer race 12 of the ball bearing 3. V belts 8, which are adapted to transmit torque from a drive source, are fitted on a pulley 7 integrally formed with the outer periphery of the disc. In FIG. 1, numeral 9 designates a clutch plate attracted by the electromagnet 4 to the disc 5, and numeral 10 designates a driven shaft.

When the rolling bearing 3 shown in FIGS. 1 and 2 was used in a compressor unit between the electromagnetic clutch and compressor under a discharge pressure of 10–15 kg f/cm$^2$ and suction pressure of 0.2–0.8 kg, grease leaked from the sealing portion 19 between the grease seal 15 and inner race 11. The leakage was realized even when organic thickner grease, which provides less leakage, was used.

More specifically, spaces A, B and C exist relative to the bearing 3. The space A is surrounded by heat transfer elements such as a compressor (not shown), the electromagnet 4, and the bearing 3 and is thus susceptible to increased heating. It has been found that the temperature distribution is such that the relative temperatures in spaces A, B and C can be expressed by the inequality $A > B > C$. The pressure is generated in the spaces A, B and C according to the relation $A \geq B > C$. The air flow is thus directed from the space A in the clutch body 1 to which the compressor is attached, toward the space C between the clutch plate 9 and axial end of bearing 3 so that grease within the bearing 3 flows as shown in FIG. 2 during rotation with a component (h) in addition to flow components (a), (b). This component (h) brings the grease between seal 15 and the inner race 11 resulting in a grease leak.

SUMMARY OF THE INVENTION

It is an object of the present invention to provide a sealed bearing which is provided therein with a means for moderately controlling the speed and quantity of grease which flows therein.

A further object of the invention is to provide a sealed bearing having a grease flow induction passage to minimize grease leakage.

The aforementioned objects are attained in accordance with the present invention by providing a rolling bearing so arranged that rolling elements are equally and circumferentially spaced and held by a retainer between inner and outer races which are sealed with a sealing plate secured to the outer race. The retainer includes an annular projection extending radially inwardly from the end face thereof closest the seal plate, the annular projection extending beyond the inner circumferential surface of the retainer into the annular space between that inner surface of the retainer and the outer circumferential surface of the inner race to form a small gap between the end of the projection and the outer circumference of the inner race. The projection has an inclined surface extending from the end face of the retainer in a direction away from the seal plate to thereby define an annular projection of tapered configuration. The seal plate is provided with a portion which faces the inclined surface of the annular projection, that portion of the seal plate defining another inclined surface oriented in the same direction as the inclined surface of the retainer projection, to form between the two inclined surfaces a lubricant induction passage in communication with the small gap between the inner race and retainer projection.

BRIEF DESCRIPTION OF THE DRAWINGS

FIGS. 4, 5 and 6 are longitudinal, cross-sectional views each showing a modified form of the seal plate of the invention.

FIGS. 7a and 7b are longitudinal, cross-sectional views each illustrating the exterior of an annular projection formed on the retainer in accordance with the teachings of the invention.

FIG. 8 is a longitudinal, cross-sectional view showing the manner in which the present invention is embodied in a double row ball bearing assembly constructed of two single row ball bearings.

DETAILED DESCRIPTION OF THE PREFERRED EMBODIMENT

Figure 1:
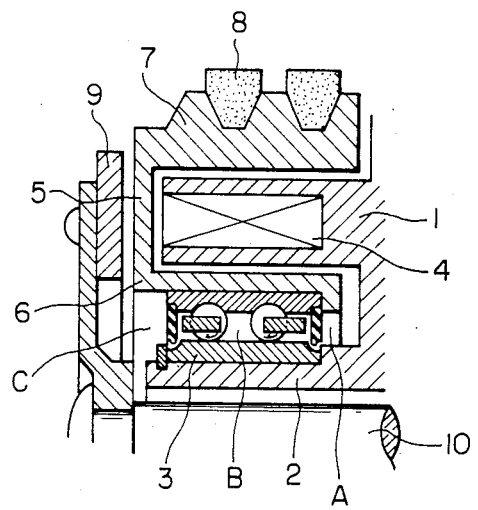
FIG. 1 is a longitudinal, cross-sectional view of a substantial portion of a conventional electromagnetic clutch for a car cooler compressor.
Figure 2:
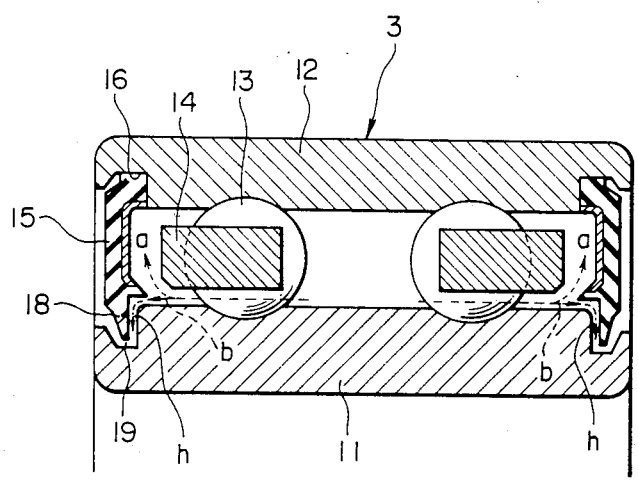
FIG. 2 is an enlarged longitudinal, cross-sectional view of the bearing assembly shown in FIG. 1.
Figure 3:
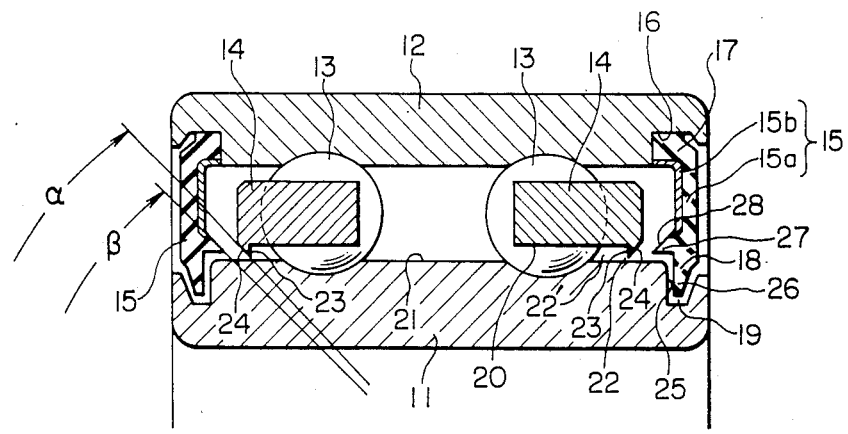
FIG. 3 is a longitudinal, cross-sectional view of an embodiment of the present invention.

The invention will now be explained with reference to the embodiments thereof illustrated in FIGS. 3–8. FIG. 3 illustrates a double row ball bearing sealed with grease seals 15, wherein numerals 11, 12 are generally cylindrical inner and outer races, respectively, and numeral 13 designates rolling elements circumferentially and equidistantly spaced about the bearing and held therein by generally cylindrical retainers between the inner and outer races 11, 12.

The grease seals 15 are seal plates whose outer peripheral edges 17 are mounted in peripheral grooves 16 formed in the inner circumferential surface of the outer race 12 at opposite ends thereof. Non-contact sealing portions 19 are formed between inner peripheral edges 18 of the seals 15 and the inner race 11.

Each of the retainers 14 includes an inner circumferential surface 20 which is provided at one end thereof with an annular projection 23 that extends radially inwardly from the end face of the retainer closest the seal plate to form a small gap 22 between an outer circumferential surface 21 of the inner race 11 and the retainer projection 23. The exterior of the annular projection 23 is formed into an inclined surface 24, inclined at an angle of $\alpha$ to the longitudinal axis.

The seal plate 15 has a radial lip 26 formed on its inner peripheral edge 18. This lip extends radially into but not in contact with the peripheral groove 25 formed at the end of the outer circumferential surface 21 of the inner race 11. An axial lip 27 is also provided which extends slightly over the outer circumferential surface 21 of the inner race 11. A non-contact sealing portion 19 is thus provided between the seal plate 15 and the inner race 11. The axial lip 27 of the seal plate 15 includes a portion which confronts the inclined surface 24 of the annular projection 23 and is formed into an inclined surface 28 inclined at an angle $\beta$, in the same direction as in the inclined surface 24 of the projection 23. A grease inducing passage is formed between the inclined surface 24 of the annular projection 23 of the retainer 14 and the other inclined surface 28 of the axial lip 27 which communicates with the small gap 22.

Figure 4:
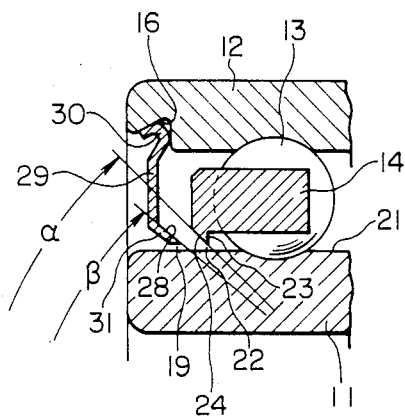

Although the seal plate 15 consists of an annular main body 15a of sealants such as rubber, synthetic resin and the like and a reinforcing ring 15b incorporated therein, an annular seal plate 29 formed of sheet metal or synthetic resin board may be used, as shown in FIGS. 4 and 5. The annular seal plate 29 shown in FIG. 4 is adapted to rigidly mount its outer peripheral edge 30 in the peripheral groove 16 formed in the inner circumferential surface of the outer race 12. The annular seal plate 29 is provided with an inner periphery 31 which forms the inclined surface 28 inclined at an angle $\beta$ in the same direction as in the inclined surface 24 of the annular projection 23 formed at one end of the inner circumferential surface 20 of the retainer 14 to form the small gap 19 between the inner periphery of the seal plate and the outer circumferential surface 21 of the inner race 11. The annular seal plate 29 shown in FIG. 5 is adapted to firmly mount its outer peripheral edge 30 in the peripheral groove 16 formed in the inner circumferential surface of the outer race 12 at both ends thereof, and has the inner periphery 31 which forms the inclined surface 28 inclined at an angle $\beta$ in the same direction as is the inclined surface formed at one end of the inner circumferential surface 20 of the retainer 14. A tip end 32 of the seal plate is bent axially and outwardly to form the small gap 19 between the outer surface 21 of the inner race 11 and the plate 29. FIG. 6 shows the annular seal plate 29 formed of sealants such as rubber, synthetic resin and the like. The plate 29 is designed to incline its inner peripheral edge 31 at an angle $\beta$ in the same direction as is the inclined surface 24 of the annular projection 23 formed in the retainer 14 to define the inclined surface 28. The tip end 32 of the plate 29 is bent axially and outwardly to slidably abut against the outer surface 21 of the inner race 11.

In the embodiments shown in FIGS. 3, 4, 5 and 6, the grease inducing passage is provided between the inclined surface 28 formed in the inner periphery 31 of the annular seal plate 15, 29 and the other inclined surface 24 of the annular projection 23 formed in the retainer 14 disposed opposite thereto and communicating with the small gap 22.

Modified forms of the retainer 14 are shown in FIGS. 7a and 7b. FIG. 7a illustrates the retainer 14 which is adapted to form its end face with an inclined surface 24' which merges with the inclined surface 24. The inclined surface 24' is at an angle $\alpha'$ wider than the angle $\alpha$. The surface 24 shown in FIG. 7b defines an arcuate surface having the radius of curvature of R. Accordingly, the inner periphery 31 of the seal plate 29 is configured to provide an angled surface or arcuate surface depending upon the configuration of the inclined surfaces 24, 24'.

In each of the previously described embodiments, an inclined angle $\alpha$ of the annular projection 23 of the retainer 14, which defines a grease inducing passage, is equal to or moderately wider than an inclined angle $\beta$ of the inner periphery 18, 31 of the annular seal plate 15, 29 to facilitate the flow of grease to the outer race 12.

Although the aforementioned embodiments describe the invention with reference to a double row ball bearing, the invention may be incorporated into a bearing assembly comprised of two single row ball bearings as shown in FIG. 8.

According to the invention herein described, the retainer of a bearing assembly has an annular projection extending from the lower corner of the retainer end face closest to the seal plate, the projection extending radially into the annular space between the outer circumferential surface of the inner race and the inner circumferential surface of the retainer, the projection having an inclined surface extending from the end face in a direction away from the seal plate. Further, the seal plate includes a portion which confronts the annular projection of the retainer and which defines another inclined surface oriented in the same direction as the inclined surface of the projection to form between both inclined surfaces a lubricant induction passage in communication with the small gap defined by the end of the projection and the outer surface of the inner race.

Contrary to the conventional bearing assembly which is designed so that grease therein flows with rotation of the retainers and rolling elements and is accelerated according to the environment of the bearing assembly and thus likely to flow at a high speed, the instant bearing assembly is fabricated so that grease is squeezed through the small gap 22 between the annular projection 23 of the retainer 14 and the outer circumferential surface 21 of the inner race 11 to control grease movement so as to reduce the flow rate and flow quantity thereof. Grease thus passing through the small gap 22 is smoothly-guided by the lubricant inducing passage to the outer race 12. As a result, much grease at a higher flow rate is prevented from directly flowing into a sealing portion 19 defined between the inner periphery 18, 31 of the seal plate 15, 29 and the inner race 11 so that grease leakage from the sealing portion 19 is sufficiently avoided.

The sealed type rolling bearing assembly according to the invention may be applied to not only an electromagnetic clutch bearing assembly for a car cooler compressor but also to other devices needing a bearing assembly of the type described herein.

Although the invention has been described with reference to specific embodiments thereof, it is apparent that many modifications may be made by one skilled in the art, and accordingly, it is intended that the scope of the invention be limited only as defined in the following claims.

What is claimed is:

1. A rolling bearing apparatus comprising:
   a plurality of rolling elements;
   at least one annular retainer means for positioning and holding said rolling elements equidistant from each other and circumferentially;
   an inner and an outer annular race between which said at least one retainer and said plurality of rolling elements are positioned;
   at least one seal plate secured to an end of the outer race;
   said at least one retainer means including an annular portion at one end thereof having an inner and an outer circumferential surface, an end face opposite said seal plate and an annular projection extending radially from the inner circumferential surface into a space between said annular portion of the retainer means and inner race to form an annular small gap between the projection and the inner race, said projection having an inclined surface extending from said end face opposite said seal plate in a direction away from said seal plate; and
   said seal plate including a portion which confronts the inclined surface of said projection and which defines another inclined surface oriented in the same direction as the inclined surface of the projection to form between both inclined surfaces a lubrication induction passage in communication with said small gap.

2. The rolling bearing as claimed in claim 1, wherein the angle of inclination of the inclined surface of said projection is wider than the angle of inclination of the inclined surface of said portion of the seal plate.

3. The rolling bearing as claimed in claim 1, wherein said rolling bearing is a double row ball bearing and includes first and second annular retainer means, and first and second seal plates, each of said retainer means including an annular portion at one end thereof having an inner and outer circumferential surface, an end face opposite a respective seal plate and an annular projection extending radially from the inner circumferential surface of the retainer means into an annular space between said annular portion of the retainer means and the inner race to form a small gap between the projection and the inner race, the projection having an inclined surface extending from the end face opposite its respective seal plate in a direction away from its respective seal plate.

4. The rolling bearing as claimed in claim 1, wherein said seal plate consists of an annular main body of sealant material and a reinforcing ring.

5. The rolling bearing as claimed in claim 1, wherein said seal plate is a sheet metal seal plate.

6. The rolling bearing as claimed in claim 1, wherein said seal plate is a synthetic resin board seal plate.

7. The rolling bearing as claimed in claim 1, wherein said seal plate includes a tip end extending axially from the end of said inclined surface of said seal plate in a direction away from said at least one retainer means.

8. The rolling bearing as claimed in claim 1, wherein said inner race includes at least one annular groove in an end portion of the inner circumferential surface thereof, said at least one seal plate including a radial lip extending into said groove.

9. The rolling bearing as claimed in claim 1, wherein said end face of the retainer means opposite said seal plate includes a vertical portion and an inclined portion, said inclined surface of said projection extending from said inclined portion.

10. The rolling bearing as claimed in claim 1, wherein said inclined surface of said projection is arcuate in shape.

11. The rolling bearing as claimed in claim 10, wherein said inclined surface of said seal plate is arcuate in shape.

* * * * *